| (12) | United States Patent | (10) Patent No.: | US 11,121,988 B2 |
|---|---|---|---|
| | Daikohara et al. | (45) Date of Patent: | Sep. 14, 2021 |

(54) MANAGEMENT SERVER, MANAGEMENT SYSTEM, METHOD OF CONTROLLING A MANAGEMENT SERVER AND PROGRAM

(71) Applicant: NEC Corporation, Tokyo (JP)

(72) Inventors: Keisuke Daikohara, Tokyo (JP); Kouichi Onodera, Tokyo (JP); Hirokazu Kawano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 65 days.

(21) Appl. No.: 16/496,993

(22) PCT Filed: Mar. 29, 2018

(86) PCT No.: PCT/JP2018/013493
§ 371 (c)(1),
(2) Date: Sep. 24, 2019

(87) PCT Pub. No.: WO2018/181834
PCT Pub. Date: Oct. 4, 2018

(65) Prior Publication Data
US 2020/0322291 A1   Oct. 8, 2020

(30) Foreign Application Priority Data

Mar. 30, 2017   (JP) .............................. JP2017-069247

(51) Int. Cl.
*H04L 12/58*   (2006.01)
*H04L 29/08*   (2006.01)

(52) U.S. Cl.
CPC .............. *H04L 51/04* (2013.01); *H04L 51/16* (2013.01); *H04L 51/22* (2013.01); *H04L 67/306* (2013.01)

(58) Field of Classification Search
None
See application file for complete search history.

(56) References Cited

U.S. PATENT DOCUMENTS 6,591,291 B1 * 7/2003 Gabber ................ G06Q 10/107
370/393
6,981,023 B1 * 12/2005 Hamilton .......... H04L 29/12009
709/206

(Continued)

FOREIGN PATENT DOCUMENTS

JP   2007-183717 A   7/2007
JP   2011-239328 A   11/2011

(Continued)

OTHER PUBLICATIONS

International Search Report for PCT Application No. PCT/JP2018/013493, dated May 22, 2018.

*Primary Examiner* — Backhean Tiv
(74) *Attorney, Agent, or Firm* — Sughrue Mion, PLLC

(57) ABSTRACT

A management server comprises a memory section including at least two memory areas, a message reception section which receives a message, a message conversion section which converts the message and generates a transmission message and a message transmission section which transmits the transmission message to a specified destination, wherein the memory section stores in the memory areas a temporary Identification (ID) link in which a real ID of a user and a temporary ID of the user are associated, and wherein the message conversion section converts, in a case where the message includes a first temporary ID which corresponds to a real ID and is stored in a first memory area, the first temporary ID to a second temporary ID which corresponds to the real ID, on a basis of the temporary ID link stored in a second memory area, and generates the transmission message.

13 Claims, 9 Drawing Sheets

(56) References Cited

U.S. PATENT DOCUMENTS

| | | | | |
|---|---|---|---|---|
| 7,120,927 B1* | 10/2006 | Beyda | ............... | H04L 51/12 |
| | | | | 726/2 |
| 7,231,428 B2* | 6/2007 | Teague | ............... | G06Q 10/107 |
| | | | | 709/206 |
| 9,361,602 B1* | 6/2016 | Hodges | ............... | G06Q 10/107 |
| 2003/0200334 A1* | 10/2003 | Grynberg | ............... | H04L 29/12066 |
| | | | | 709/245 |
| 2006/0026438 A1* | 2/2006 | Stern | ............... | H04L 51/12 |
| | | | | 713/184 |
| 2006/0168045 A1* | 7/2006 | Pickover | ............... | G06Q 10/107 |
| | | | | 709/206 |
| 2007/0142029 A1* | 6/2007 | Willehadson | ............... | H04L 51/066 |
| | | | | 455/405 |
| 2007/0282958 A1* | 12/2007 | Erikawa | ............... | H04L 12/1822 |
| | | | | 709/206 |
| 2008/0256201 A1* | 10/2008 | Flowers | ............... | H04L 51/14 |
| | | | | 709/206 |
| 2008/0267117 A1* | 10/2008 | Stern | ............... | H04L 65/4084 |
| | | | | 370/329 |
| 2009/0106383 A1* | 4/2009 | Liang | ............... | H04L 51/28 |
| | | | | 709/206 |
| 2010/0161747 A1* | 6/2010 | Rayan | ............... | H04L 29/12433 |
| | | | | 709/206 |
| 2014/0258559 A1* | 9/2014 | Vendrow | ............... | H04L 67/306 |
| | | | | 709/246 |
| 2020/0322291 A1* | 10/2020 | Daikohara | ............... | H04L 67/306 |

FOREIGN PATENT DOCUMENTS

| | | |
|---|---|---|
| JP | 2016-115330 A | 6/2016 |
| WO | 2016/079862 A1 | 5/2016 |

* cited by examiner

FIG. 7

| NAME SPACE | NICKNAME DATA | NICKNAME |
|---|---|---|
| NAME SPACE OF USER A | name(A→A) | hanako |
| | name(A→B) | taro |
| | name(A→C) | jiro |
| NAME SPACE OF USER B | name(B→A) | hana |
| | name(B→B) | t_suzuki |
| | name(B→C) | foo |
| NAME SPACE OF USER C | name(C→A) | foo |
| | name(C→B) | suzuki |
| | name(C→C) | jiro |

MANAGEMENT SERVER, MANAGEMENT SYSTEM, METHOD OF CONTROLLING A MANAGEMENT SERVER AND PROGRAM

FIELD

Disclosure about Related Application

This application is a National Stage Entry of PCT/JP2018/013493 filed on Mar. 29, 2018, which claims priority from Japanese Patent Application 2017-069247 filed on Mar. 30, 2017, the contents of all of which are incorporated herein by reference, in their entirety.

The present invention is related to a management server, a management system, a method of controlling a management server and a program.

BACKGROUND

In recent years, various services and application programs for communicating via a network are provided.

In such services and application programs, at least two users are registered and a unique identifier (ID) is set for each user. Then, users perform communications between users by transmitting and receiving messages (text sentences or the like) by use of the set IDs.

Alternatively, in above described services and application programs, a temporary ID is set with a unique ID for each user. Then, the users perform communications between users by transmitting and receiving messages (text sentences or the like) by use of the set temporary ID.

In the Patent Literature 1, a technology of setting a temporary ID, so that the temporary ID has anonymity, is described. In particular, in the technology described in the Patent Literature 1, in a case where a plurality of temporary IDs are grouped and any one of a plurality of groups is judged not to satisfy anonymity, a part of temporary ID among the plurality of temporary IDs is changed.

In the Patent Literature 2, a technology in which a mail server manages mail addresses (that is, unique IDs) is described. And, in the technology described in Patent Literature 2, the mail server receives an e-mail in which a destination name (temporary ID) is specified, identifies a mail address corresponding to the destination name, adds the mail address to the received e-mail and delivers the e-mail.

[Patent Literature 1] JP2016-115330A
[Patent Literature 2] JP2007-183717A

SUMMARY

It should be noted that the disclosure in the above described prior art documents is incorporated by reference in the present document. Following analyses has been performed from aspects of the present invention.

For example, in a situation in which people temporarily gather, such as a group tour, there are cases in which it is necessary for participants to contact between themselves on the basis of agreement between themselves. However, in a case of communicating by setting a unique ID for each user, it will be possible to permanently communicate between users.

For this reason, in a case where a unique ID set to each user has been notified to others, it will be possible for a user corresponding to this ID to accept contacts from an opponent, after a necessity of contacting has been eliminated, even from an opponent whom it is undesired to contact.

In addition, even in a case of communicating by use of a temporary ID (nickname) set to each user, the correspondence relationship between a unique ID and a temporary ID set to each user may be leaked to others. In such a case, it will be possible for a user corresponding to a leaked unique ID to accept contacts from an opponent, after a necessity of contacting has been eliminated, even from an opponent whom it is undesired to contact.

In the technology described in Patent Literature 1, temporary IDs are determined so that a plurality of users is target of one temporary ID. For this reason, users cannot communicate in one-on-one by use of temporary IDs with the technology described in Patent Literature 1.

In the technology described in Patent Literature 2, transmission mails are configured to include a source mail address. Therefore, the source mail address will be disclosed to the user of the e-mail destination with the technology of Patent Literature 2.

Therefore, the present invention aims to provide a management server, a management system, a method of controlling a management server and a program which contribute to smooth communications between a plurality of persons via a network by avoiding disclosure of personally identifiable information to others.

In accordance with a first aspect, a management server is provided.

This management server is provided with a memory section including at least two memory areas.

Further, this management server is provided with a message reception section which receives a message.

Further, this management server is provided with a message conversion section which converts the message and generates a transmission message.

Further, this management server is provided with a message transmission section which transmits the transmission message to a specified destination. The memory section stores in the memory areas a temporary ID link in which a real ID of a user and a temporary ID of this user are associated.

The message conversion section converts, in a case where the message includes a first temporary ID stored in a first memory area corresponding to a real ID, the first temporary ID to a second temporary ID which corresponds to the real ID, on the basis of the temporary ID link stored in a second memory area, and generates the transmission message.

In accordance with a second aspect, a management system is provided.

This management system is configured to comprise at least two terminals and a management server which connects the terminals via a network.

The management server is provided with a memory section including at least two memory areas.

Further, the management server is provided with a message reception section which receives a message from the terminals.

Further, the management server is provided with a message conversion section which converts the message and generates a transmission message.

Further, the management server is provided with a message transmission section which transmits the transmission message to a terminal of a specified destination.

The memory section stores in the memory areas a temporary ID link in which a real ID of a user and a temporary ID of this user are associated.

The message conversion section converts, in a case where the message includes a first temporary ID which is stored in a first memory area corresponding to a real ID, the first temporary ID to a second temporary ID which corresponds to the real ID, on the basis of the temporary ID link stored in a second memory area, and generates the transmission message.

In accordance with a third aspect, a method of controlling a management server is provided. This management server is provided with a memory section which includes at least two memory areas.

This method of controlling comprises storing a temporary ID link, to which a real ID of a user and a temporary ID of this user are associated, in the memory areas.

Further, this method of controlling comprises receiving a message.

Further, this method of controlling comprises converting, in a case where the message includes a first temporary ID stored in a first memory area corresponding to a real ID, the first temporary ID to a second temporary ID corresponding to the real ID, on the basis of the first temporary ID link stored in a second memory area, and generating a transmission message.

Further, this method of controlling comprises transmitting the transmission message to a specified destination.

It should be noted that the present method is associated to a specific machine that is a management server which transfers messages.

In accordance with a fourth aspect, a program is provided. This program is a program for making a computer, which controls a management server provided with a memory section including at least two memory areas, to execute.

This program makes the computer to execute a process of storing a temporary ID link, to which a real ID of a user and a temporary ID of this user are associated, in the memory areas.

Further, this program makes the computer to execute a process of receiving a message.

Further, this program makes the computer to execute a process of converting, in a case where the message includes a first temporary ID stored in a first memory area corresponding to a real ID, the first temporary ID to a second temporary ID corresponding to the real ID, on the basis of the first temporary ID link stored in a second memory area, and generating a transmission message.

Further, this program makes the computer to execute a process of transmitting the transmission message to a specific destination.

It should be noted that the present program can be stored in a computer-readable storage medium. The storage medium may be non-transient, such as a semiconductor memory device, a hard disk drive, a magnetic storage medium, an optical storage medium and the like. The present invention may be realized as a computer program product.

According to each aspect, a management server, a management system, a method of controlling a management server and a program, which contribute to smooth communications between a plurality of persons via a network by avoiding disclosure of personally identifiable information to others, will be provided.

BRIEF DESCRIPTION OF DRAWINGS

FIG. 7 is a diagram showing an example of correspondence relationship between nicknames data and nicknames.

PREFERRED MODES

At first, an outline of an exemplary embodiment will be described by referring to FIG. 1. It should be noted that drawing referring symbols which are added to this outline are added to each component for convenience to help understanding as an example, and the description of the outline does not intend any limitation. In addition, connection lines between blocks in each block diagram include both bidirectional ones and unidirectional ones. One-way arrows schematically show flows of main signals (data) while their bi-directionality is not excluded.

As described above, a management server, which contributes to smooth communications between a plurality of persons via a network by avoiding disclosure of personally identifiable information to others, is desired.

Figure 1:
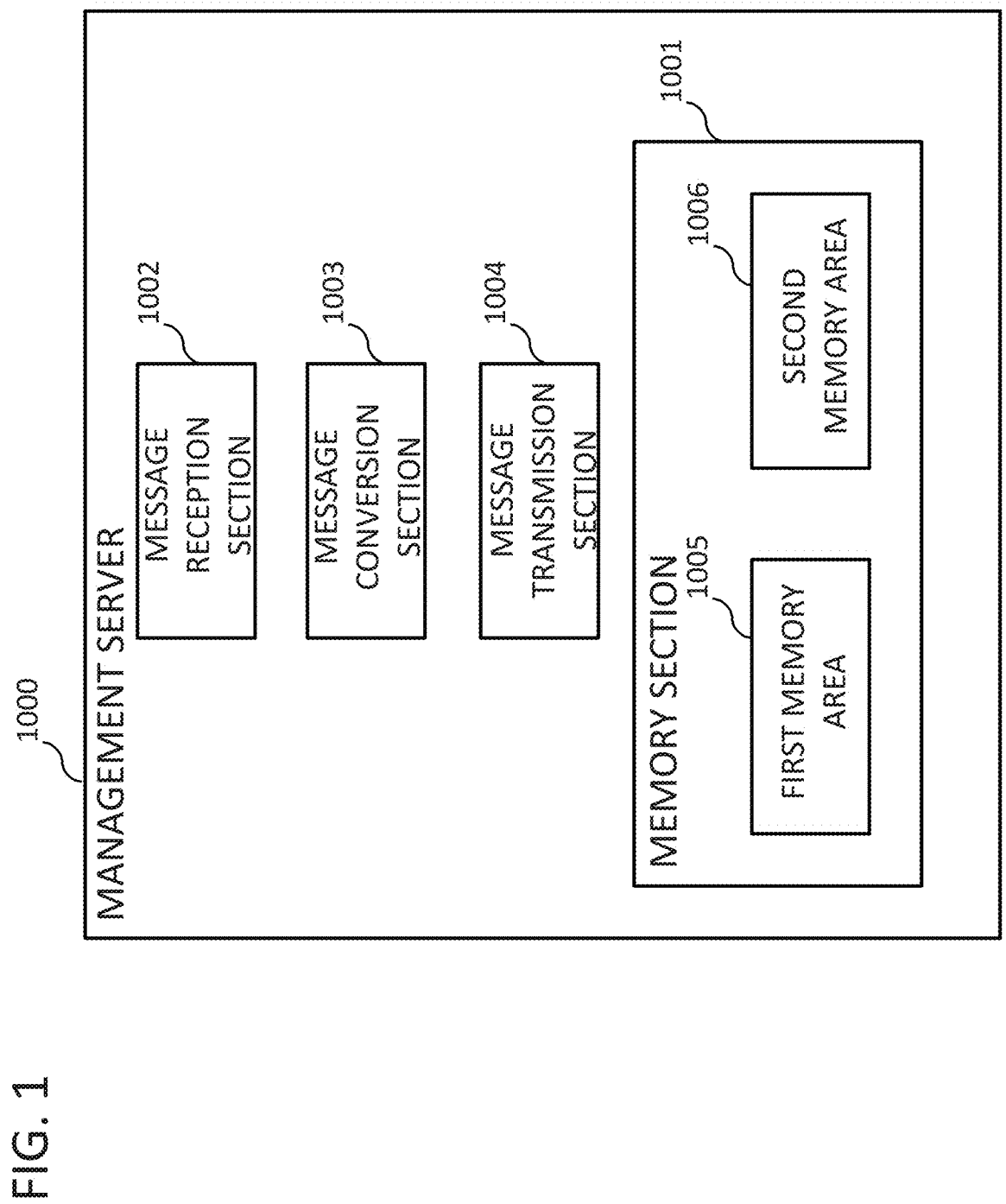
FIG. 1 is a diagram for describing an outline of an exemplary embodiment.

Thus, as an example, a management server 1000 shown in FIG. 1 is provided. The management server 1000 is provided with a memory section 1001, a message reception section 1002, a message conversion section 1003 and a message transmission section 1004.

The memory section 1001 includes at least two memory areas (a first memory area 1005, a second memory area 1006). It should be noted that in FIG. 1, although two memory areas are shown for a convenience of description, it is not intended to limit a number of memory areas to two.

The memory section 1001 stores a temporary ID link, in which a real ID of a user and a temporary ID of this user are associated, in the memory areas (the first memory area 1005 and the second memory area 1006).

Here, the real ID of a user is information to uniquely identify the user. On the other hand, the temporary ID is information to identify each user and is information different from the real ID. For example, a real ID of an identical user may be associated with different temporary IDs in temporary ID links stored in different memory areas.

The message reception section 1002 receives messages. In particular, the message reception section 1002 receives data including a character string from a user and destined to other user as a message. Further, it may be considered that a message that the message reception section 1002 receives is configured to include a temporary ID showing the user.

The message conversion section 1003 converts messages received by the message reception section 1002 and generates a transmission message.

Here, it may be considered that a received message includes a first temporary ID corresponding to a real ID stored in the first memory area 1005. In this case, the message conversion section 1003 converts the first temporary ID to a second temporary ID corresponding to the real ID, on the basis of the temporary ID link stored in the second memory area 1006, and generates the transmission message.

The message transmission section 1004 transmits the transmission message to a specified destination.

For example, it may be considered that the first memory area 1005 stores a temporary ID determined by a user of a source of a message. That is, it may be considered that the first memory area 1005 stores a temporary ID link in which the temporary ID determined by the user of the source of the message and a real ID of the user corresponding to this temporary ID are associated. On the other hand, it may be considered that the second memory area 1006 stores a temporary ID determined by a user of a destination of the message. That is, it may be considered that the second memory area 1006 stores a temporary ID link in which the temporary ID determined by the user of the destination of the message and a real ID of the user corresponding to this temporary ID are associated.

In this case, the above described first temporary ID is equivalent to the temporary ID determined by the user of the source of the message. On the other hand, the above described second temporary ID is equivalent to the temporary ID determined by the user of the destination of the message.

For this reason, the management server 1000 converts the temporary ID determined by the user of the source of the message included in the received message. And, the management server 1000 converts the temporary ID in the received message to the temporary ID determined by the user of the destination of the message and transmit a message to this destination.

Therefore, the management server 1000 contributes to transmit a message without disclosing a real ID of a user to others. Further, the management server 1000 contributes to transmit a message without disclosing a temporary ID determined by a user of a source of a message to a user of a destination of the message.

Therefore, the management server 1000 contributes to smooth communications between a plurality of persons via a network by avoiding disclosure of personally identifiable information to others.

First Exemplary Embodiment

A first exemplary embodiment will be described in more detail by referring to drawings. It should be noted that in the following description the above described memory areas will be also called "name space". In addition, in the following description, the above described temporary ID will be called "nickname". In addition, in the following description, the above described temporary ID link will be called "nickname link".

In addition, in the following description, a variable (data) showing a nickname will be noted "X→Y". It may be considered that the character on the left side of "→" shows a name of a user who is the subject to use a nickname. On the other hand, it may be considered that the character on the right side of "→" shows a name of a user to be a target of whom a nickname is used. For example, it may be considered that "X→Y" shows a variable (data) showing "a nickname used by a user X to specify a user Y".

In addition, in the following description, it may be considered that a variable (data) showing a nickname presents a character string showing a nickname that is actually used. In addition, in the following description, the actually used nickname that the variable (data) showing a nickname presents will be noted as "X→Y=Z". This shows that "the nickname used by the user X to specify the user Y" is "Z". In addition, in the following description, a variable (data) showing a nickname will be called "nickname data".

Figure 2:
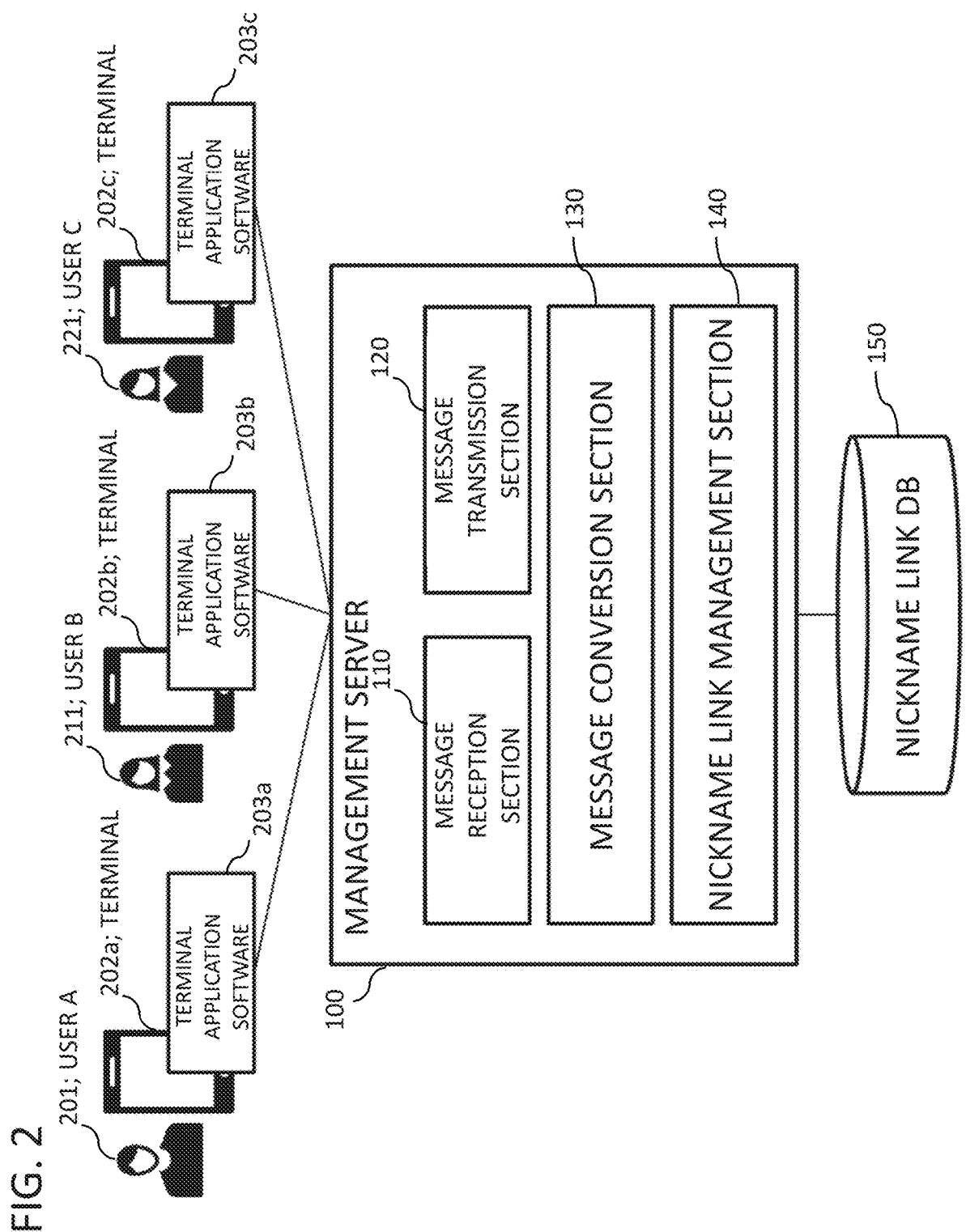
FIG. 2 is a diagram showing an example of an overall configuration of a management system related to a first exemplary embodiment.

FIG. 2 is a drawing showing an example of an overall configuration of a management system related to the present exemplary embodiment. The management system shown in FIG. 2 is configured to include a management server 100 and at least two terminals (202a to 202c). It should be noted that in the following description the terminals (202a to 202c) will be noted "terminal(s) 202" in a case where it is not necessary to distinguish, respectively. In addition, although FIG. 2 shows three terminals (202a to 202c), it is not intended to limit a number of the terminals 202 to three. The management system related to the present exemplary embodiment may be configured to include two, four or more terminals 202.

The management server 100 is an information processing device (a computer) which manages real IDs and temporary IDs of users. The management server 100 is configured to include a Central Processing Unit (CPU), a memory device, a communication means and the like.

The terminal 202 is an information processing device (a computer) used by a user. The terminal 202 is configured to include a CPU, a memory device, a communication means and the like. The terminal 202 connects to the management server 100 via a network by use of the communication means.

In a case of FIG. 2, a user A 201, a user B 211 and a user C 221 use terminals 202a, 202b and 202c, respectively. It may be considered that the terminals (202a to 202c) are equipped with (installed of) terminal application software (203a to 203c), respectively. In addition, it may be considered that the terminal application software (203a to 203c) is identical application software. It should be noted that in the following description terminal application software (203a to 203c) will be noted "terminal application software 203" in a case where it is not necessary to distinguish, respectively.

Here, the terminal application software 203 is application software installed on the terminals 202. The terminal application software 203 of each terminal 202 performs transmission and reception of message between terminal application software 203 of terminals 202 used by other users, via the management server 100.

In the following, the management server 100 will be described in detail.

The management server 100 is configured to include a message reception section 110, a message transmission section 120, a message conversion section 130 and a nickname link management section (temporary ID link management section) 140.

Further, the management server 100 is accessible to a nickname link database (DB) 150. For example, a memory device (not illustrated) provided to the management server 100 may store the nickname link DB 150. Alternatively, a device different from the management server 100 may store the nickname link DB 150. In a case where a device different from the management server 100 stores the nickname link DB 150, the management server 100 may access to the nickname link DB 150 by accessing to the device which stores the nickname link DB 150 as appropriate.

The nickname link DB 150 stores information (nickname link) in which nickname data and real IDs are associated. As described above, the nickname data is a variable (data) showing nicknames.

For example, the nickname link DB 150 may store information (nickname links), in which nickname data and real IDs are associated, in a table format. It should be noted that in the following description, for a convenience of description, it will be described by considering that the nickname link DB 150 stores information (nickname links) in which the nickname data and real IDs are associated, in a table format. And, in the following description, a table in which nickname data and real IDs are associated will be called nickname table. However, it is not intended to limit the nickname link DB 150 to store information (nickname links) in which nickname data and real IDs are associated in a table format.

The message reception section 110 receives messages from the terminal application software 203.

The message transmission section 120 transmits messages to the terminal application software 203.

The message conversion section 130 converts nicknames included in messages (destination and text) received by the message reception section 110 to a nickname in accordance with a destination of the message.

In particular, the message conversion section 130 refers to the nickname link DB 150 and specifies a name space corresponding to the destination of the message. And, the message conversion section 130 refers to the nickname link DB 150 and acquires a nickname table corresponding to the specified name space. And, the message conversion section 130 refers to the acquired nickname table and specifies a nickname corresponding to the real ID of the user.

And, the message conversion section 130 converts the nickname included in the message (destination and text) to the acquired nickname.

For example, it may be considered that the terminal application software 203 generates a message by adding a specific character (for example, "@" or the like) to the nickname in the message. In this case, the message converting section 130 may extract a nickname from the message on a basis of the specific character added to the nickname. And, the message conversion section 130 may convert the nickname extracted from the message to the acquired nickname.

The nickname link management section 140 manages nickname links managed by the nickname link DB 150. In particular, the nickname link management section 140 manages the linking between nickname and real ID.

More specifically, the nickname link management section 140 defines (generates) a name space (memory area) corresponding to each user in the nickname link DB 150. Here, the nickname link DB 150 may store information identifying a name space and a real ID of a user by associating them to each other.

And, the management server 100 stores information (nickname links) in which a nickname corresponding to each user and a real ID of this each user in each name space generated in the nickname link DB 150.

The nickname link management section 140 generates information, in which a real ID of any one user of at least two users, a nickname of any one of this one user or a user different from the one user, and a real ID of a user corresponding to this nickname are associated, as a nickname link.

And, the nickname link management section 140 stores the generated nickname link in a memory area (name space) corresponding to the real ID of this one user. It should be noted that the nickname link management section 140 generates at least two nickname links corresponding to real IDs of different users. And, the nickname link management section 140 stores the generated at least two nickname links to different memory areas (name spaces), respectively.

The nickname link management section 140 may limit a range of disclosing a nickname of each user to users corresponding to name spaces in which nickname link of this nickname is stored.

In addition, in a case of converting nicknames, the terminal 202 corresponding to this one user may transmit a current nickname and a new nickname of at least one user to the management server 100.

And, the nickname link management section 140 specifies a real ID of a user corresponding to the current nickname on the basis of the temporary ID link stored in the name space corresponding to the real ID of this one user. And, the nickname link management section 140 converts the received current nickname, corresponding to this specified real ID in this nickname link, to the received new nickname.

In the following, nickname links will be described in detail, by referring to FIGS. 2 and 3. For example, it may be considered that the user A 201, the user B 211 and the user C 221 are registered in the management server 100 as users of terminal application software (203a to 203c), as shown in FIG. 2.

Figure 3:
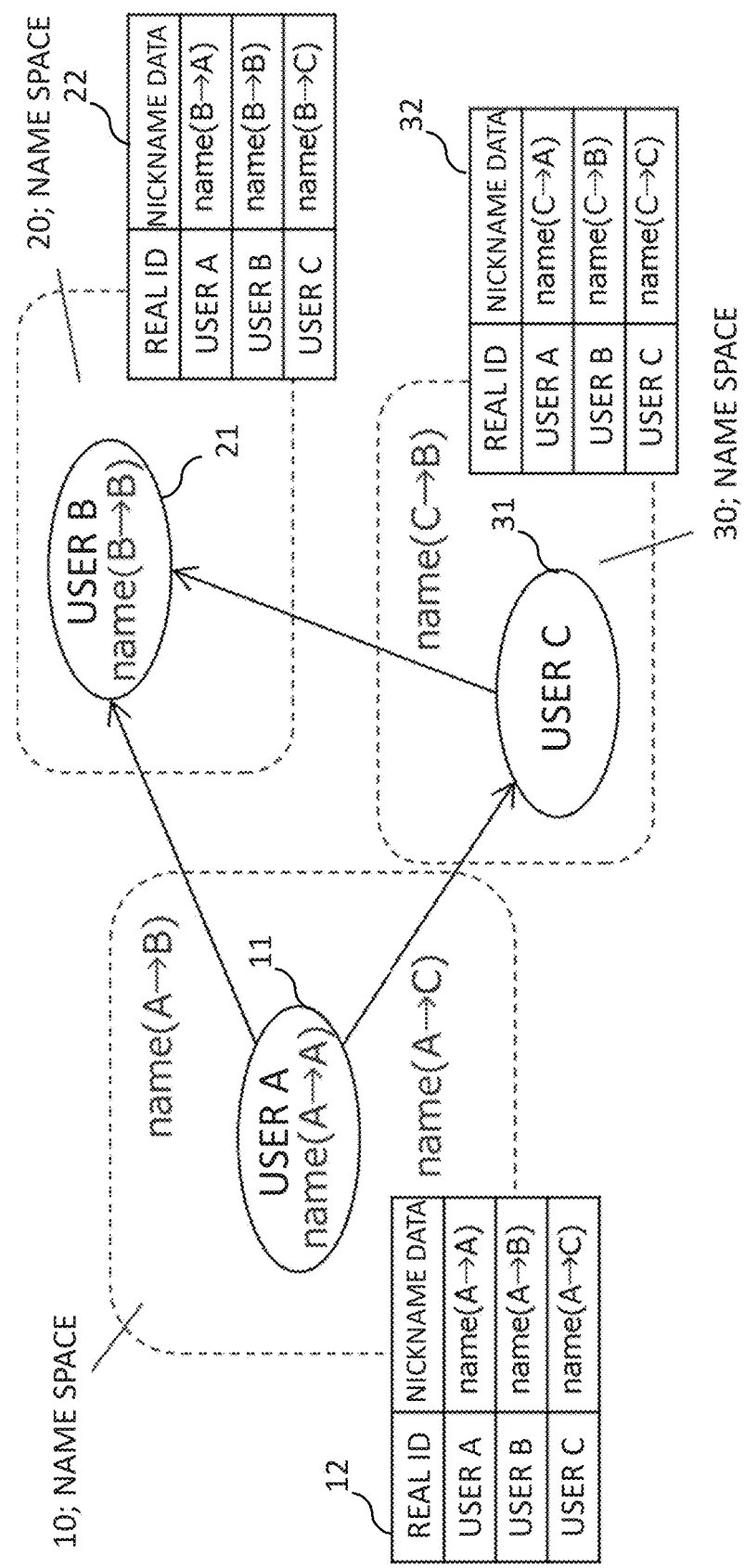
FIG. 3 is a diagram showing an example of nickname links.

In this case, the nickname link management section 140 defines (generates) a name space 10 of the user A 201, a name space 20 of the user B 211 and a name space 30 of the user C 221, which are shown in FIG. 3, in the nickname link DB 150.

The nickname link management section 140 stores the nickname link corresponding to the terminal 202a of the user A 201 in the name space 10 of the user A 201. Similarly, the nickname link management section 140 stores the nickname link corresponding to the terminal 202b of the user B 211 in the name space 20 of the user B 211. In addition, the nickname link management section 140 stores the nickname link corresponding to the terminal 203c of the user C 221 in the name space 30 of the user C 211.

For example, in the name space 10 of the user A 201, the nickname data 11 corresponding to the user A 201 himself/herself is "name(A→A)". In addition, in the name space 10 of the user A 201, the nickname data corresponding to the user B 211 is "name(A→B)". In addition, in the name space 10 of the user A 201, the nickname data corresponding to the user C 221 is "name(A→C)". Therefore, the nickname link DB 150 stores the nickname table 12 shown in FIG. 3 in the name space 10 of the user A 201.

Similarly, in the name space 20 of the user B 211, the nickname data 21 corresponding to the user B himself/herself is "name(B→B)". And, the nickname link DB 150 stores the nickname table 22 shown in FIG. 3 in the name space 20 of the user B 211. Similarly, in the name space 30 of the user C 211, the nickname data 31 corresponding to the user C himself/herself is "name(C→C)". And, the nickname DB 150 stores the nickname table 32 shown in FIG. 3 in the name space 30 of the user C 221.

For example, it may be considered that "name(A→B)=taro", "name(B→B)=t_suzuki" and "name(C→B)=suzuki". In this case, the message conversion section 130 converts the nickname of the user B 211 in the message to be transmitted to the terminal 202a of the user A 201, to "taro". In addition, the message conversion section 130 converts the nickname of the user B 211 in the message to be transmitted to the terminal 202b of the user B 211, to "t_suzuki". In addition, the message conversion section 130 converts the nickname of the user B 211 in the message to be transmitted to the terminal 202c of the user C 221, to "suzuki". And, the message transmission section 120 transmits the message, in which the nickname is converted, to the terminal application software 203, to the terminal 202 which is the destination of this message.

That is, even if messages are destined to an identical user, the management server 100 converts to different nicknames in accordance with destinations of messages and transmits messages.

Next, operations of the management system related to the present exemplary embodiment will be described in detail.

Figure 4:
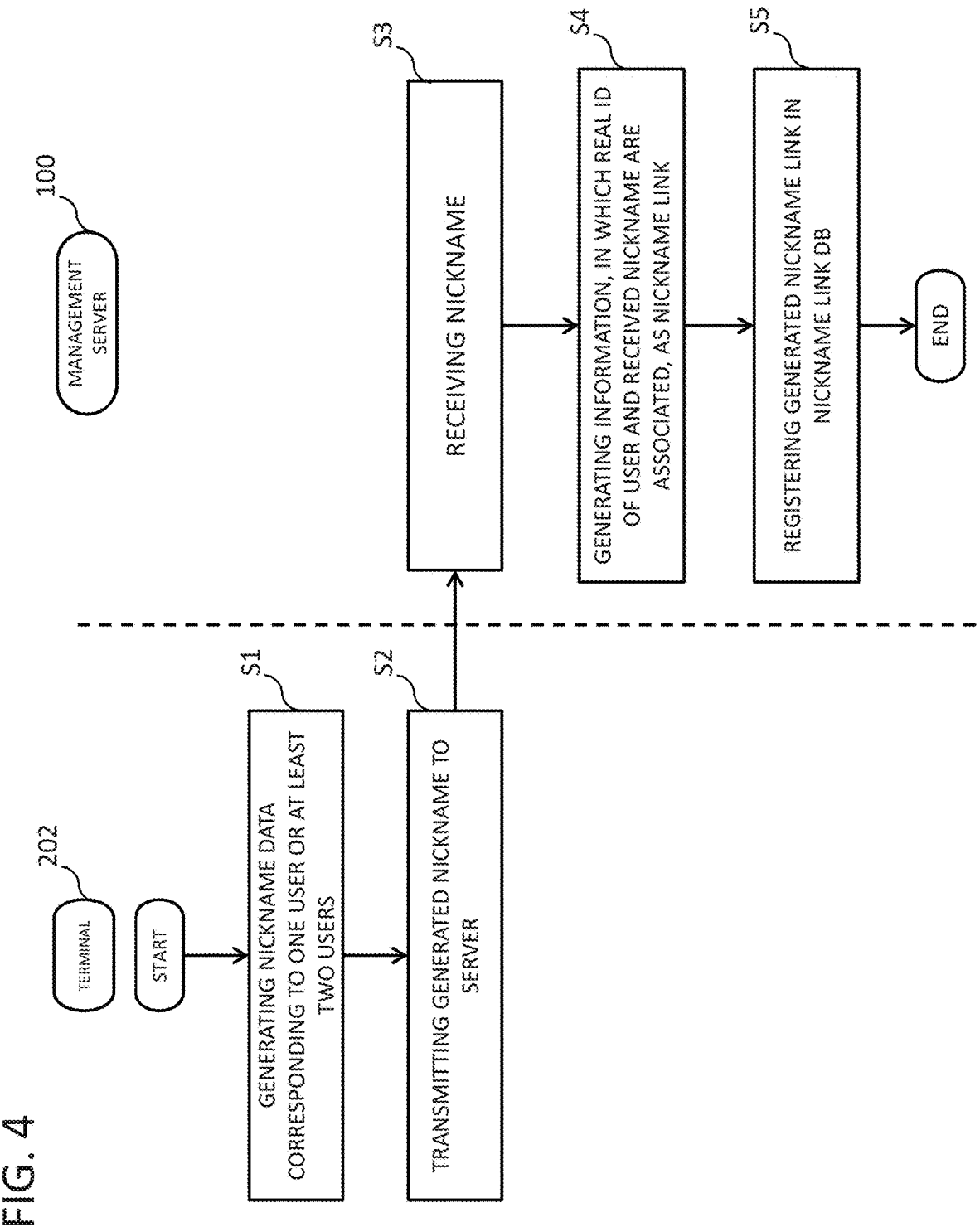
FIG. 4 is a flowchart showing an example of processes of the management system related to the first exemplary embodiment.

First, a process of registering nickname links will be described by referring to FIG. 4.

In a step S1, the terminal 202 generates a nickname data corresponding to one user or at least two users. For example, the user of the terminal 202 may input nickname of this user himself/herself and/or nickname(s) of user(s) different from this user to the terminal 202. In this case, the terminal 202 may generate nickname data on the basis of the inputted nickname(s) of each user.

For example, it may be considered that the terminal 202 is configured to include an application program (hereafter called "phonebook application") which manages information related to one user of at least two users. In this case, the terminal 202 may determine a user name registered in the phonebook application as a nickname of the user. And, the terminal 202 may generate nickname data on the basis of the determined user name (that is, the user name registered in the phonebook application).

In the step S2, the terminal 202 transmits the generated nickname data to the management server 100.

In the step S3, the nickname management section 140 of the management server 100 receives the nickname data.

In the step S4, the nickname link management section 140 generates information, in which the real ID of the user and the received nickname data are associated, as the nickname link.

In the step S5, the nickname link management section 140 registers the generated nickname link in the nickname DB.

Figure 5:
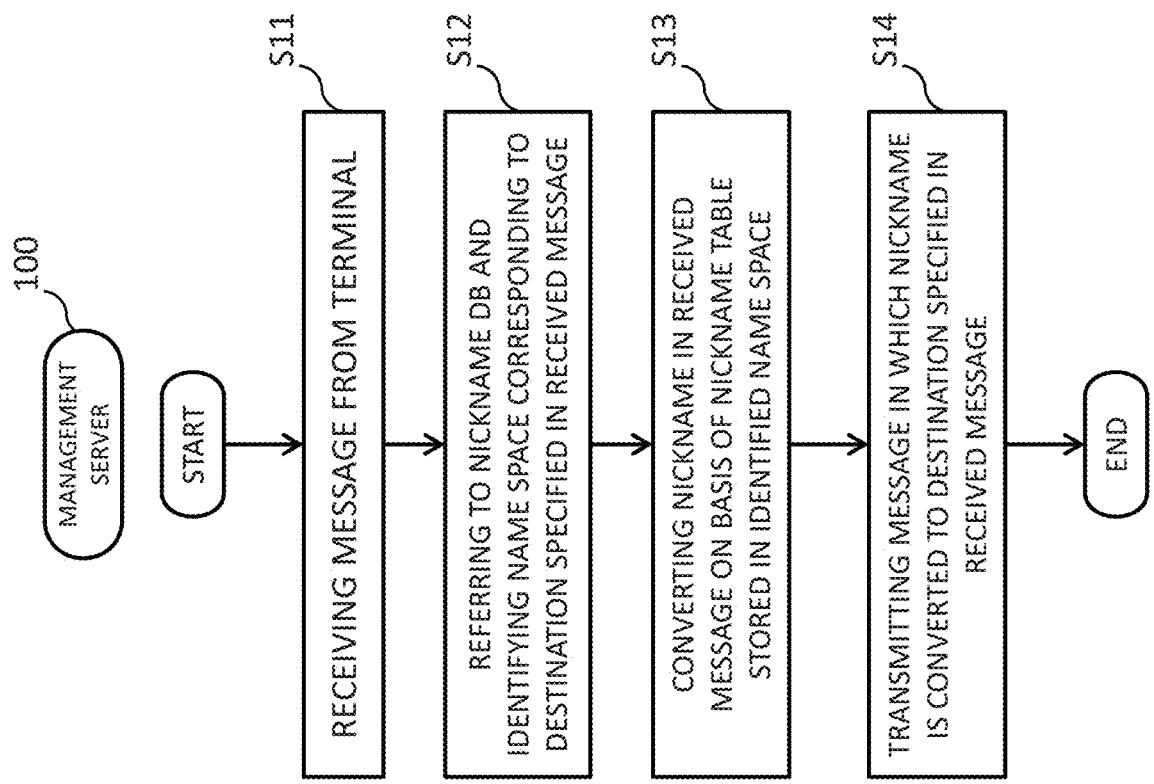
FIG. 5 is a flowchart showing an example of processes of a management server 100 related to the first exemplary embodiment.

Next, a process of converting nicknames in messages will be described, by referring to FIG. 5.

In the step S11, the message reception section 110 receives a message from the terminal 202.

In the step S12, the message conversion section 130 refers to the nickname link DB 150 and identifies a name space corresponding to the destination specified in the received message.

In the step S13, the message conversion section 130 converts the nickname in the received message on the basis of the nickname table stored in the identified name space.

In the step S14, the message transmission section 120 transmits the message in which the nickname is converted to the destination specified in the received message.

Figure 6:
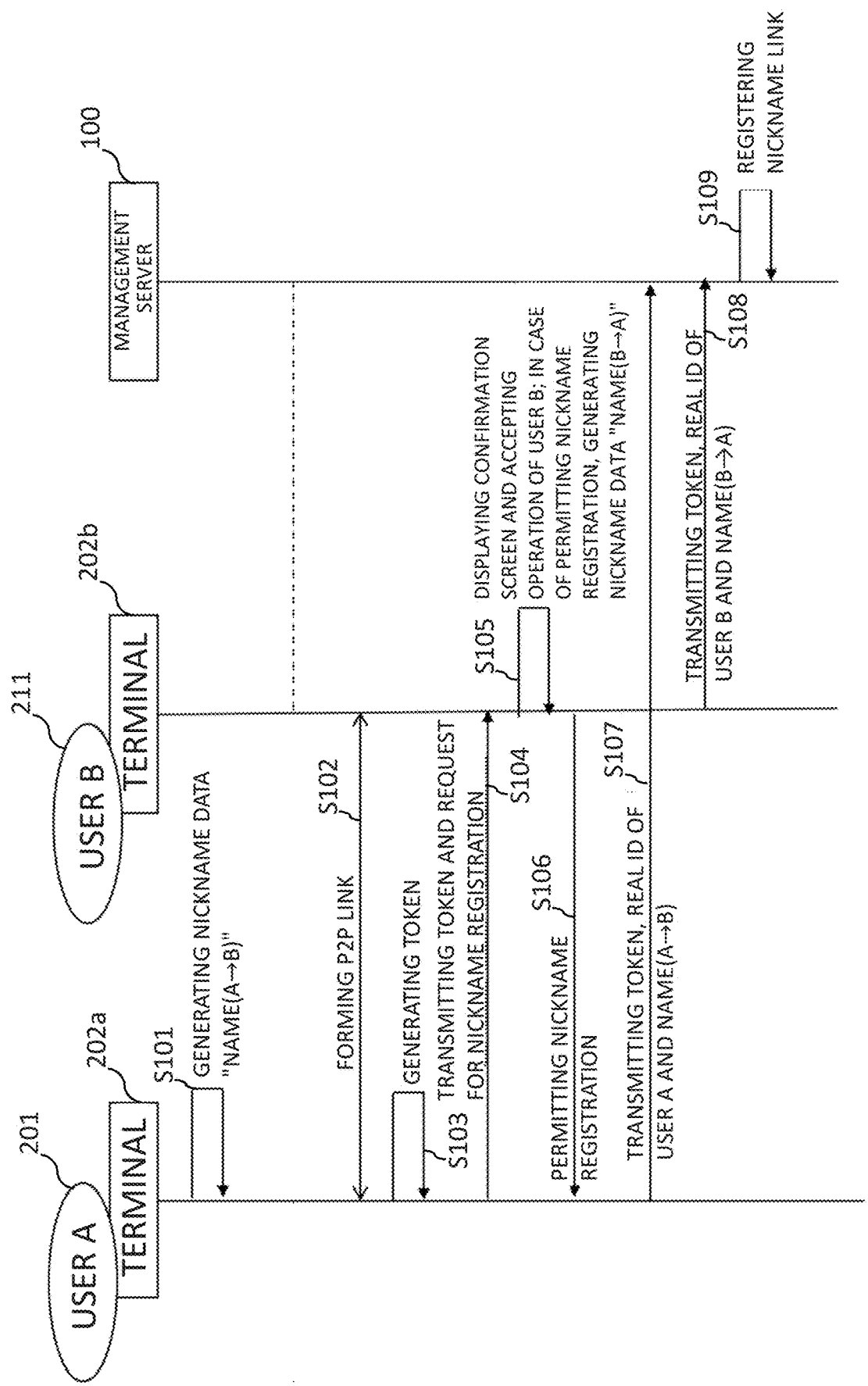
FIG. 6 is a sequence diagram showing an example of operations of the management system related to the first exemplary embodiment.

Next, operations of the management system of the present exemplary embodiment will be described in more detail, by referring to FIG. 6. FIG. 6 is a sequence diagram showing an example of operations of the management system of the present exemplary embodiment. In particular, the sequence diagram shown in FIG. 6 exemplifies a case where the user A 201 determines the nickname of the user B 211 and the management server 100 registers the nickname. It should be noted that, as described above, it may be considered that the terminal 202a is the terminal that the user A 201 uses. In addition, it may be considered that the terminal 202b is the terminal that the user B 211 uses.

In the step S101, the terminal 202a that the user A 201 uses generates the nickname data "name(A→B)".

In the step S102, the terminal 202a forms a Peer-to-Peer (P2P) link between the terminal 202a and the terminal 202b. For example, the terminal 202a may form a P2P link between the terminal 202a and the terminal 202b by use of Near Field Communication (NFC).

In the step S103, the terminal 202a generates a token. And, in the step S104, the terminal 202a transmits the token and a request for nickname registration to the terminal 202b. Here, the request for nickname registration is a signal to request a permission of nickname registration to the terminal 202b.

In the step S105, the terminal 202b displays a confirmation screen and accepts an operation of the user B 211. And, the terminal 202b generates the nickname data "name (B→A)" in a case where the nickname registration is permitted. And, in the step S106, the terminal 202b notifies the terminal 202a of permitting the nickname registration.

In particular, when the terminal 202b receives the token and the request for nickname registration from the terminal 202a, the terminal 202b displays the confirmation screen and accepts an operation of the user (user B 211) of the terminal 202b. The user (user B 211) of the terminal 202b decides whether or not to permit the terminal 202a to register the nickname.

In a case of permitting nickname registration, the user (user B 211) of the terminal 202b inputs the permission of nickname registration to the terminal 202b. Further, the user (user B 211) of the terminal 202b decides the nickname of the user A 201 to input to the terminal 202b.

And, in a case of having accepted an operation of permitting the nickname registration and an operation of inputting the nickname of the user A 201, the terminal 202b adds the nickname of the user A 201 and generates a nickname data "name(B→A)".

For example, Social Networking Service (SNS) application software executes a process in which one user registers one other user as a "friend". And, in a case where the one user registered the other user as a "friend", the SNS application software permits transmission and reception of messages between this one user and this other user. For example, it may be considered that messages are transmitted and/or received between the terminal 202a and the terminal 202b by use of this SNS application software. In this case, in a case where the SNS application software has executed a process of registering a user as a "friend", the terminal 202a and the terminal 202b may execute the process of the step S104 and the process of the step S105 described above.

In the step S107, the terminal 202a transmits a token, the real ID of the user A 201 and the nickname data "name (A→B)" to the management server 100.

In the step S108, the terminal 202b transmits the token, the real ID of the user B 211 and the nickname data "name(B→A)" to the management server 100.

In the step S109, the management server 100 registers the nicknames. In particular, the management server 100 generates information in which the real ID and the nickname data are associated as the nickname link, by use of the token as a key.

Next, a process of converting the nickname in the message will be described by referring to FIG. 7. It should be noted that, in the following description, a case where the terminal application software 203 adds the specific character "@" as a prefix to the nickname in the message and generate the message will be exemplified to describe.

FIG. 7 is a diagram showing a correspondence relationship between nickname data and nicknames corresponding to the user A 201, the user B 211 and the user C 221. In particular, FIG. 7 shows the nickname data and the nicknames stored in the name space of the user A 201 (name space 10 shown in FIG. 3). Further, FIG. 7 shows the nickname data and the nicknames stored in the name space of the user B 211 (name space 20 shown in FIG. 3). Further, FIG. 7 shows the nickname data and the nicknames stored in the name space of the user C 221 (name space 30 shown in FIG. 3).

For example, it may be considered that the terminal application software of the terminal 202a generates a message destined to the user B 211 and the user C 221. In this case, according to FIG. 7, the nickname of the user A 201, the nickname of the user B 211 and the nickname of the user C 221 are respectively "hanako", "taro" and "jiro" in the name space of the user A 201.

For this reason, the terminal application software of the terminal 202a generates a message with the nickname of "@hanako" as the source thereof. Further, the terminal application software of the terminal 202a generates this message with the nicknames of "@taro" and "@jiro" as the destinations thereof. And, the terminal application software of the terminal 202a transmits the generated message to the management server 100.

The message reception section 110 receives the message from the terminal 202a. The message conversion section 130 refers to the nickname link DB 150 and identifies the name space corresponding to the source of the message. In this case, the message conversion section 130 identifies the name space of the user A 201 as the name space corresponding to the source of the message. Further, the message conversion section 130 identifies the name space of the user B 211 and the name space of the user C 221 as name spaces corresponding to the destinations of the message.

And, the message conversion section 130 refers to the nickname table stored in the name space of the user A 201 and acquires the real IDs corresponding to the nickname "taro" and the nickname "jiro".

With regard to a message destined to the user B 211, the message conversion section 130 refers to the name space of the user B 211 and converts the nickname of the source (user A 201) to "@hana". In addition, with regard to a message destined to the user B 211, the message conversion section 130 refers to the name space of the user B 211 and converts the nickname of the user B 211 to "@t_suzuki". In addition, with regard to a message destined to the user B 211, the message conversion section 130 refers to the name space of the user B 211 and converts the nickname of the user C 221 to "@foo".

With regard to a message destined to the user C 221, the message conversion section 130 refers to the name space of the user C 221 and converts the nickname of the source (user A 201) to "@foo". In addition, with regard to a message destined to the user C 221, the message conversion section 130 refers to the name space of the user C 221 and converts the nickname of the user B 211 to "@suzuki". In addition, with regard to a message destined to the user C 221, the message conversion section 130 refers to the name space of the user C 221 and converts the nickname of the user C 221 to "@jiro".

And, the message transmission section 120 transmits the message, of which nicknames have been converted on the basis of the name space of the user B 211, to the terminal 202b. In addition, the message transmission section 120 transmits the message, of which nicknames have been converted on the basis of the name space of the user C 221, to the terminal 202c.

As described above, the management server 100 related to the present exemplary embodiment defines (generates) a name space corresponding to each user and stores nickname links, in which a real ID and nicknames (nickname data) of each user are associated, in this name space. And, the management server 100 related to the present exemplary embodiment converts, when transferring a message (text and the like) transmitted and received between users, a nickname of a user in the message to a nickname corresponding to a destination of the message, on the basis of nickname links. And, the management server 100 related to the present exemplary embodiment transmits the message of with nicknames are converted to the destination of the message. Therefore, the management server 100 related to the present exemplary embodiment contributes to smooth communications between a plurality of users by use of nicknames that each user arbitrary determines. Thus, the management system related to the present exemplary embodiment contributes to smooth communications between a plurality of persons via a network by avoiding disclosure of personally identifiable information to others.

In addition, since a nickname which is different from a real ID is used in the management system related to the present exemplary embodiment, even in a case where a nickname has been leaked to others, the user corresponding to this nickname cannot be identified. Therefore, the management system related to the present exemplary embodiment contributes to prevent leakage and diffusion of personally identifiable information in communications between a plurality of persons via a network.

Variation Example 1

As a variation example 1 of the management system related to the present exemplary embodiment, the management server 100 may set an expiration time to the nickname link.

In this case, when the expiration time of the nickname link is passed, the management server 100 deletes this nickname link from the name space, by keeping the nickname data. That is, in a case where the expiration time of a nickname link is passed, the management server 100 disable the correspondence relationship between the nickname data and the real ID. As a result, in a case where the expiration time of the nickname link is passed, although the terminal 202 keeps messages which are transmitted or received and nicknames in those messages, the terminal 202 cannot newly transmit and/or receive messages using those nicknames.

Therefore, by setting of expiration time to a nickname link by the management server 100, the management system related to the present exemplary embodiment can limit a period during which users are allowed to use a nickname corresponding to this nickname link.

Variation Example 2

As a variation example 2 of the management system related to the present exemplary embodiment, the management server 100 may determine a default nickname which is unique in an identical name space to each user. In particular, the nickname link management section 140 may determine a nickname (default nickname) of at least any one user and may set the determined nickname in the determined nickname link. In addition, the nickname link management section 140 may use the predetermined default nickname to generate a nickname data and a nickname link.

In this case, the terminal 202 transmits and/or receives messages by use of default nicknames, respectively. And, in a case where a user of the terminal 202 inputted a nickname different from the default nickname, the terminal 202 transmits the inputted nickname to the management server 100.

And, the management server 100 updates the default nickname to the received nickname.

Therefore, the management system contributes to reduce, by setting default nicknames, effort of users concerning determination of nickname to each user.

Variation Example 3

As a variable example 3 of the management system related to the present exemplary embodiment, the management server 100 may permit disclosure of nickname between specified users on the basis of operations of users to terminals 202.

In this case, the terminal 202 transmits to the management server 100 a notification of permitting disclosure of nickname in a case where the terminal 202 has accepted an operation of permitting disclosure of nicknames to other users. And, the management server 100 identifies, in a case where the management server 100 has received a notification of permitting disclosure of nickname, the name space of the user of the source of the message. And, the management server 100 identifies the nickname of the disclosure target and the real ID of the disclosure target from the nickname link stored in the specified name space. And, the management server 100 notifies the nickname of the disclosure target to the terminal 202 that the user of the specified real ID uses.

Therefore, the management server 100 enable a user to disclosure the nickname that the user himself/herself has set to other specific users (for example, particularly familiar users).

For example, it may be considered that a user has set a user account that the user uses in SNS application software which is different from the terminal application software 203, as a nickname. And, it may be considered that the terminal 202 accepted an operation of permitting disclosure of this user account as a nickname to other specific users. In this case, the management server 100 notifies the nickname of the disclosure target (user account) to the terminals 202 that these specific users use. As a result, the specific users can identify the user who is the source of notification of the nickname and can even more smoothly communicate with the user who is the source of notification of nickname.

Second Exemplary Embodiment

Next, a second exemplary embodiment will be described in detail.

The present exemplary embodiment is an embodiment of grouping users who meet specific conditions and setting nickname links corresponding to relationships between users belonging to a group. It should be noted that in the description of the present exemplary embodiment, description of portions in duplicate with the above exemplary embodiment will be omitted. Further, in the description in the present exemplary embodiment, an identical symbol will be added to a component identical to the above described exemplary embodiment and the description thereof will be omitted. In addition, in the description of the present exemplary embodiment, descriptions of operations and effects which are identical to the above described exemplary embodiment will be omitted as well.

Figure 8:
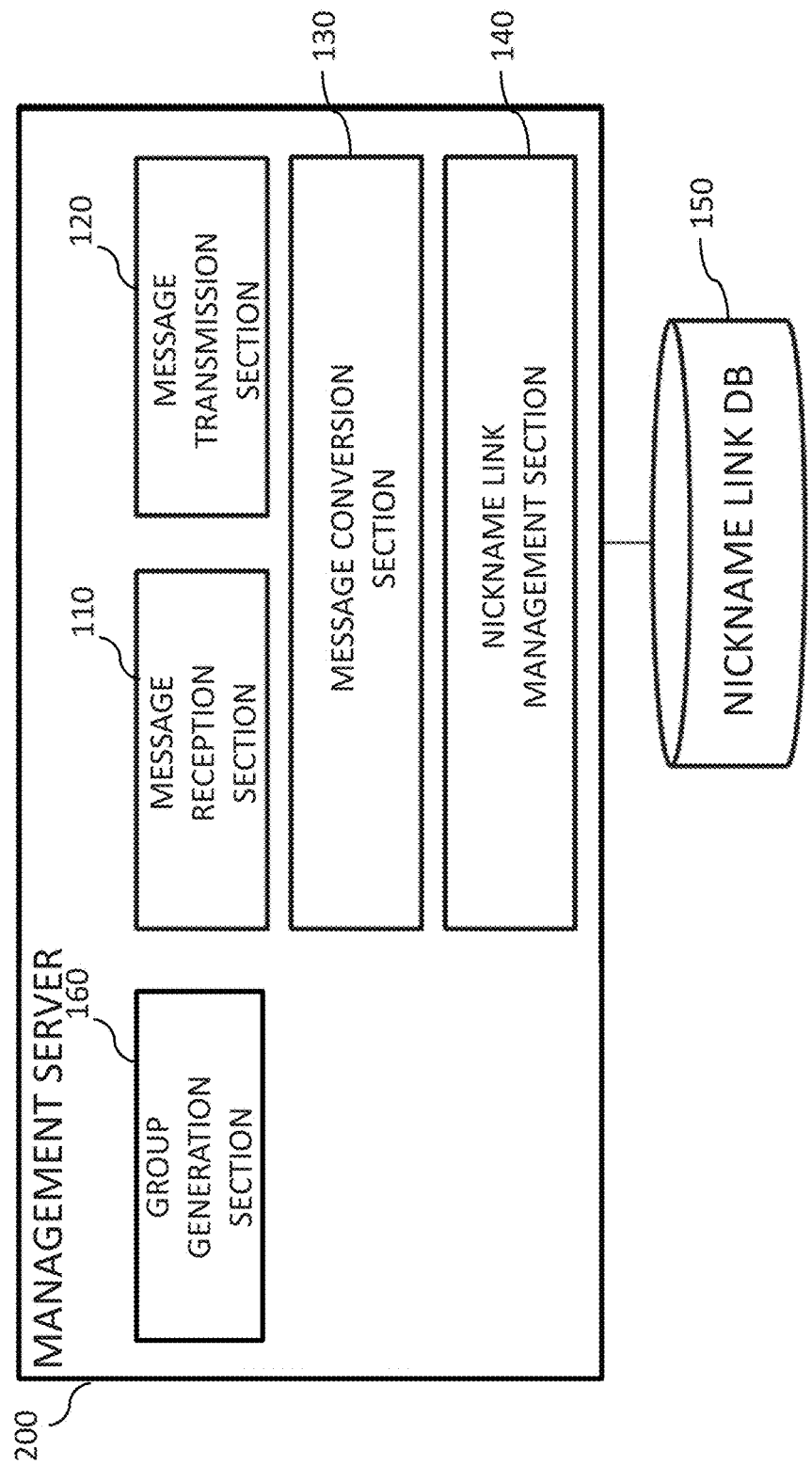
FIG. 8 is a block diagram showing an example of an internal configuration of a management server 200 related to a second exemplary embodiment.

FIG. 8 is a block diagram showing an example of an internal configuration of a management server 200 related to the present exemplary embodiment. Difference between the management server 200 shown in FIG. 8 and the management server 100 shown in FIG. 2 is that the management server 200 shown in FIG. 8 is configured to include a group generation section 160.

The group generation section 160 groups one user or at least two users who meet(s) specific condition(s) among a plurality of users registered in advance to generate a group. Further, the group generation section 160 generates, in a case where the group generation section 160 generated a group, nickname links between users belonging to the group.

Here, in a case where the group generation section 160 generated a group, the group generation section 160 may request to each user belonging to the group to set nicknames. And, the group generation section 160 may generate nickname links between users belonging to the group on the basis of nicknames set by the users.

Alternatively, the group generation section 160 may set a default nickname, which is unique in an identical name space, to each user. In this case, the group generation section 160 may generate nickname links between users belonging to the group on the basis of the default nicknames.

The group generation section 160 associates information to identify a group and the nickname links between users belonging to the group to register in the nickname link DB 150.

In addition, the group generation section 160 may set an expiration time to the generated group. In this case, the group generation section 160 sets the expiration time of the group as the expiration time of the nickname links between users belonging to this group. For this reason, the group generation section 160 disables, in a case where the expiration time of the group is passed, the nickname links between users belonging to the group.

Next, processes of generating a group will be described in detail by referring to FIG. 9. It should be noted that, in the following description, the one who provides a service (application software) of transmission and/or reception of messages to users will be called "service provider". In addition, in the following description, allotting a user to a group will be expressed as "assigning a user to a group". In addition, in the following description, the user which is a target to assign to a group will be expressed as "an assignment target user".

For example, the service provider may specify a user to assign to a group. In this case, the group generation section 160 acquires the real ID of the assignment target user. And, the group generation section 160 groups the user of the acquired real ID.

In addition, the group generation section 160 may assign a user who meets conditions specified by the service provider to a group. In particular, it may be considered that the management server 200 stores users' age, gender, residence, hobbies, behavior history, behavior schedule and the like, as information related to registered users. In this case, the service provider specifies at least any one(s) of information among the users' age, gender, residence, hobbies, behavior history and behavior schedule as condition of assignment target users.

For example, it may be considered that the management server 200 stores the residence, the age, the gender and the presence or the absence of private car ownership as information related to registered users. And, it may be considered that the service provider specified "resident in Minato-ku, Tokyo-to, thirties, male and owner of private car" as conditions of assignment target users. In this case, the group generation section 160 acquires conditions of assignment target users specified by the service provider. And, the group generation section 160 selects users meeting conditions of "resident in Minato-ku, Tokyo-to, thirties, male and owner of private car" among a plurality of users registered in advance. And, the group generation section 160 groups the selected users.

In addition, the group generation section 160 may assign users meeting conditions specified by one user to a group. In particular, it may be considered that the management server 200 is storing users' age, gender, residence, hobbies, behavior history, behavior schedule and the like as information related to registered users. In this case, the one user specifies at least any one(s) of information among users' age, gender, residence, hobbies, behavior history and behavior schedule as the condition of assignment target users.

For example, it may be considered that one user specified "thirties to forties and scheduled to leave next week for Kyoto as destination" as conditions of assignment target users. In this case, the group generation section 160 acquires the conditions of assignment target users specified by the one user. And, the group generation section 160 selects users meeting conditions of "thirties to forties and scheduled to leave next week for Kyoto as destination" among a plurality of users registered in advance. And, the group generation section 160 groups the selected users.

In addition, the group generation section 160 may assign users existing in a specific area to a group. In particular, it may be considered that the management server 200 acquires position information of users as information related to registered users. In this case, the group generation section 160 selects the users existing in the specific area as assignment target users, on the basis of position information of users. And, the group generation section 160 groups the selected users.

Figure 9:
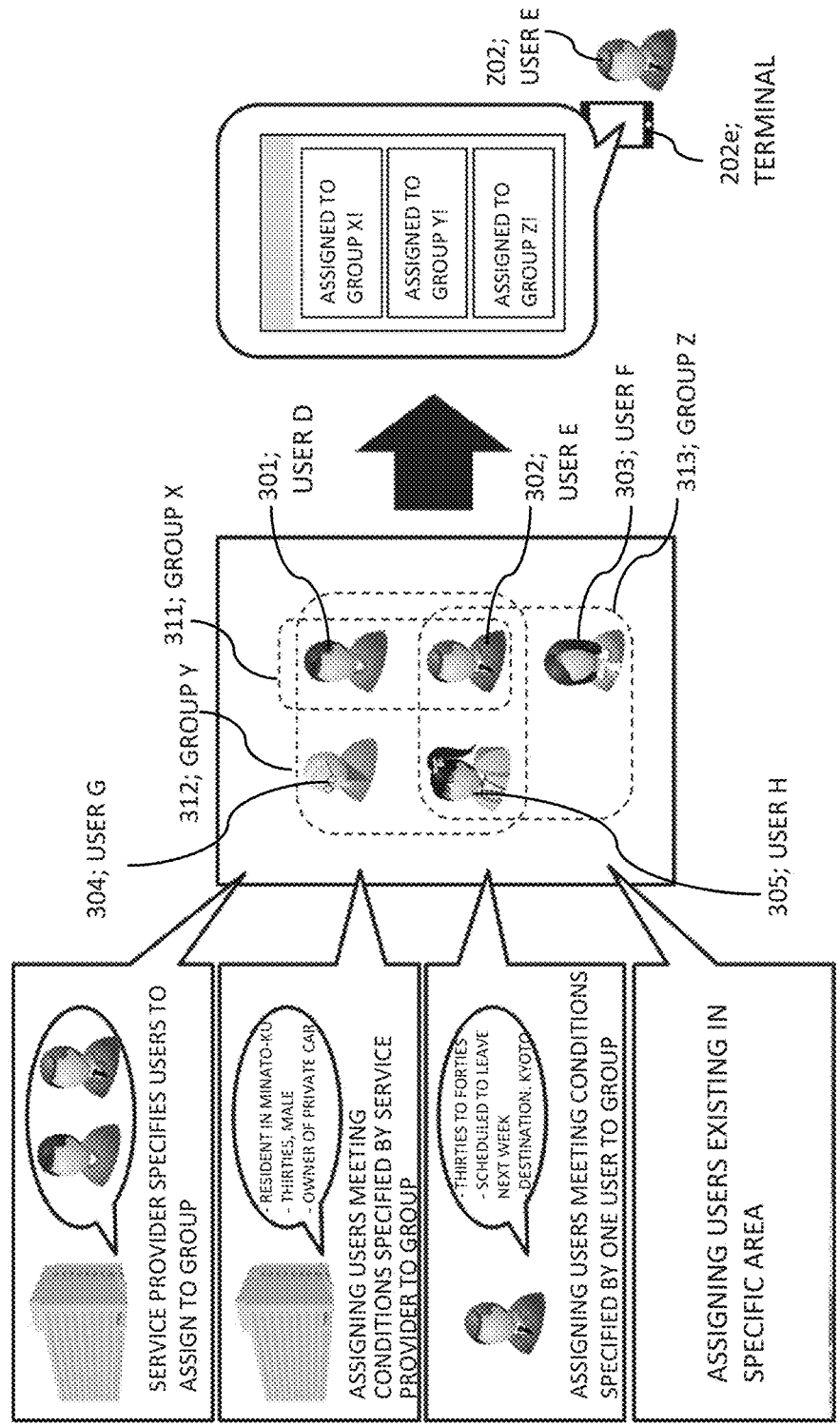
FIG. 9 is a diagram showing an example of a process for assigning a user to a group.

And, as shown in FIG. 9, it may be considered that the group generation section 160 assigned users 301 to 305 to a group X 311, a group Y 312 and a group Z 313. In particular, it may be considered that the group generation section 160 assigned the user D 301 and the user E 302 to the group X 311. In addition, the group generation section 160 assigns the user D 301, the user E 302, a user G 304 and a user H 305 to the group Y 312. In addition, the group generation section 160 assigns the user E 302, the user F 303 and the user H 305 to the group Z 313.

And, the group generation section 160 notifies the terminals 202 that the user D 301, the user E 302, the user F 303, the user G 304 and the user H 305 use, that those users are assigned to a group.

The users perform, in a case of permitting to belong to the group, operations of permitting to belong to the group to the terminals 202. And, the terminals 202 notify the management server 200 that those users permit to belong to the group. And, the group generation section 160 confirms that the group includes the users, in a case where the group generation section 160 received a notification in that those users permitted to belong to the group. The group generation section 160 judges, in a case where it is confirmed that this group includes those users, that those users permitted transmissions and receptions of message to/from other users in this group.

On the other hand, the users perform, in a case where the users do not permit to belong to the group, operations of not permitting to belong to the group, to the terminals 202. And, the terminals 202 notify the management server 200 that those users do not permit to belong to the group. And, the group generation section 160 excludes, in a case where the group generation section 160 received a notification in that those users do not permit to belong to the group, those users from this group.

For example, the group generation section 160 notifies the terminal 202e that the user E 302 uses that the user E 302 has been assigned to the group X 311, the group Y 312 and the group Z 313. And, it may be considered that the user E 302 permits to belong to the group X 311 and the group Y 312. And, it may be considered that the user E 302 does not permit to belong to the group Z 313. In this case, the group generation section 160 determines, in a case where the group generation section 160 received a notification in that the user E 302 permits to belong to the group X 311 and the group Y 312, that the group X 311 and the group Y 312 includes this user. On the other hand, the group generation section 160 excludes, in a case where the group generation section 160 received a notification in that the user E 302 does not permit to belong to the group Z 313, the user E 302 from the group Z 313.

As described above, the management server 200 related to the present exemplary embodiment groups users meeting specific conditions and sets nickname links corresponding to relationship between users belonging to the group. Further, the management server 200 related to the present exemplary embodiment may set an expiration time to the generated group. Therefore, the management server 200 related to the present exemplary embodiment contributes to smooth communications between a plurality of persons via a network by even more avoiding disclosure of personally identifiable information to others.

A part or whole of the above described exemplary embodiments may be described as following forms; however, they are not limited to the following.

(Form 1) It is identical to the management server related to the above described first aspect.

(Form 2) The management server according to the form 1, further comprising a temporary ID link management section configured to generate information, in which a real ID of any one user of at least two users, a temporary ID of at least any one of the one user and a second user different from the one user, and a real ID of a user corresponding to this temporary ID are associated, as the temporary ID link, and stores the generated temporary ID link in the memory area corresponding to the real ID of the one user, wherein the temporary ID link management section generates at least two of the temporary ID links which correspond to real IDs of different users and stores the generated at least two temporary ID links in the memory areas respectively different.

(Form 3) The management server according to the form 2, wherein the temporary ID link management section sets to the temporary ID link an expiration time of the temporary ID link and deletes, in a case where the expiration time of the temporary ID link is passed, this temporary ID link from the memory area.

(Form 4) The management server according to the form 2 or 3, wherein the temporary ID link management section generates a temporary ID of at least one user and sets the generated temporary ID to the temporary ID link.

(Form 5) The management server according to any one of forms 1 to 4, further comprising a group generation section configured to generate a group including at least two users, and further configured to generate the temporary ID link in which a real ID of a user belonging to the group and a temporary ID of this user are associated.

(Form 6) It is identical to the management system related to the above described second aspect.

(Form 7) The management system according to the form 6, wherein the terminal corresponding to any one user of the at least two users transmits a current temporary ID and a new temporary ID corresponding to at least one of the one user and one other user different from the one user to the management server, wherein the management server comprises a temporary link management section configured to identify a real ID of a user corresponding to the current temporary ID on a basis of the temporary ID link stored in the memory area corresponding to a real ID of the one user, and change the received current temporary ID corresponding to the identified real ID in this temporary ID link to the received new temporary ID.

(Form 8) The management system according to the form 7, wherein the terminal transmits a notification to allow disclosure of the temporary ID between specified users to the management server on a basis of an operation by a user, and wherein the temporary ID link management section identifies the memory area corresponding to a real ID of a user of the terminal, identifies a temporary ID as disclosure target and a real ID corresponding to this temporary ID on a basis of the temporary ID link stored in the identified memory area and notifies the temporary ID as disclosure target to the terminal corresponding to a user of the specified real ID.

(Form 9) It is identical to the method of controlling a management server related to the above described third aspect.

(Form 10) It is identical to the program related to the above described fourth aspect.

It should be noted that disclosures of the above described cited references are incorporated by reference in the present document.

Exemplary embodiments can be changed and/or adjusted within the range of whole disclosure of the present invention (including claims), and further on the basis of basic technical concept thereof. In addition, diverse combinations and/or selections of various disclosed components (including each component of each claim, each component of each exemplary embodiment, each component of each drawing, and the like) can be performed within the range of whole disclosure of the present invention. That is, the present invention of course includes each variation and modification that a skilled person in the art could perform on the basis of whole disclosure including claims and technical concept. In particular, it should be interpreted that any numeral value and/or any sub-range included in numeral ranges disclosed in the present document is specifically described even if not separately described.

DESCRIPTION OF SYMBOLS 10, 20, 30 Name space
11, 21, 31 Nickname data
12, 22, 32 Nickname table
100 Management server
110 Message reception section
120 Message transmission section
130 Message conversion section
140 Nickname link management section
150 Nickname link database
200 Management server
160 Group generation section
201 User A
202a to 202c, 202e Terminal
203a to 203c Terminal application
211 User B
221 User C
301 User D
302 User E
303 User F
304 User G
305 User H
311 Group X
312 Group Y
313 Group Z

What is claimed is:

1. A management server comprising:
a memory section including at least two memory areas and configured to store instructions; and
at least one processor configured to execute the instructions, to perform processing comprising:
storing a temporary ID (Identification) link, to which a real ID of a user and a temporary ID of the user are associated, in the at least two memory areas;
receiving a message;
converting, in a case where the message includes a first temporary ID which corresponds to a real ID and is stored in a first memory area, the first temporary ID to a second temporary ID which corresponds to the real ID, on a basis of the temporary ID link stored in a second memory area, for generating a transmission message; and
transmitting the transmission message to a specified destination.

2. The management server according to claim 1, the processing further comprising:
generating information, in which a real ID of any one user of at least two users, a temporary ID of any one of the one user and a user other than the one user, and a real ID of a user corresponding to the temporary ID are associated, as the temporary ID link;
storing the temporary ID link, which is generated, in the first memory area corresponding to the real ID of the one user, generating at least two of the temporary ID links which correspond to real IDs of different users;
and storing the generated at least two temporary ID links in the at least two memory areas respectively different.

3. The management server according to claim 2, the processing further comprising:
setting to the temporary ID link an expiration time of the temporary ID link and deletes, in a case where the expiration time of the temporary ID link is passed, the temporary ID link from the at least two memory areas.

4. The management server according to claim 2, the processing further comprising:
generating a temporary ID of at least one user and sets the generated temporary ID to the temporary ID link.

5. The management server according to claim 1, the processing further comprising:
generating a group including at least two users, and generating the temporary ID link in which a real ID of a user belonging to the group and a temporary ID of the user are associated.

6. A management system configured to comprise:
at least two terminals; and
a management server configured to connect to the terminals via a network, wherein the management server comprises:
a memory section including at least two memory areas and configured to store instructions; and at least one processor configured to execute the instructions, to perform processing comprising:
storing, in the at least two memory areas, at least two temporary ID links to which a real ID of a user and temporary IDs of the user are associated;
receiving a message converting, in a case where the message includes a first temporary ID corresponding to a real ID stored in a first memory area, the first temporary ID to a second temporary ID which corresponds to the real ID, on a basis of a temporary ID link stored in a second memory area, for generating a transmission message.

7. The management system according to claim 6,
wherein the terminal corresponding to any one user of at least two users transmits a current temporary ID and a new temporary ID corresponding to at least one of the one user and a user different from the one user to the management server,
wherein the management server identifies a real ID of a user corresponding to the current temporary ID on a basis of the temporary ID link which corresponds to a real ID of the one user and is stored in the at least two memory areas, and changes the current temporary ID, which is received, corresponding to the identified real ID in the temporary ID link to the new temporary ID which is received.

8. The management system according to claim 7, wherein the terminals transmit a notification to allow disclosure of the temporary ID between specified users to the management server on a basis of an operation by a user, and wherein the management server identifies a memory area corresponding to a real ID of a user of the terminal, identifies a temporary ID as disclosure target and a real ID corresponding to the temporary ID on a basis of the temporary ID link stored in the identified memory area and notifies the temporary ID as disclosure target to the terminal corresponding to a user of the real ID which is identified.

9. A method of controlling a management server which comprises
a memory section including at least two memory areas, the method of controlling the management server comprising: storing a temporary ID link, to which a real ID of a user and a temporary ID of the user are associated, in the at least two memory areas;
receiving a message;
converting, in a case where the message includes a first temporary ID which corresponds to a real ID and is stored in a first memory area, the first temporary ID to a second temporary ID which corresponds to the real ID, on a basis of the temporary ID link stored in a second memory area, for generating a transmission message; and
transmitting the transmission message to a specified destination.

10. The method of controlling the management server according to claim 9, comprising:
generating information, in which a real ID of any one user of at least two users, a temporary ID of any one of the one user and a user other than the one user, and a real ID of a user corresponding to the temporary ID are associated, as the temporary ID link; and
storing the temporary ID link, which is generated, in the first memory area corresponding to the real ID of the one user, wherein at least two of the temporary ID links corresponds to real IDs of different users and the generated at least two temporary ID links are stored in the at least two memory areas respectively different.

11. The method of controlling the management server according to claim 10, comprising: setting to the temporary ID link an expiration time of the temporary ID link; and deleting, in a case where the expiration time of the temporary ID link is passed, the temporary ID link from the at least two memory areas.

12. The method of controlling the management server according to claim 10, comprising: generating a temporary ID of at least one user; and setting the generated temporary ID to the temporary ID link.

13. The method of controlling the management server according to claim 9, comprising: generating a group including at least two users and the temporary ID link in which a real ID of a user belonging to the group and a temporary ID of the user are associated.

* * * * *